US011702543B2

(12) United States Patent
Green et al.

(10) Patent No.: US 11,702,543 B2
(45) Date of Patent: Jul. 18, 2023

(54) 3D-PRINTED NANOCOMPOSITES WITH METAL DIBORIDE NANOSHEETS

(71) Applicants: Alexander A. Green, Scottsdale, AZ (US); Matthew Gilliam, Tempe, AZ (US); Ahmed Yousaf, Hillsboro, OR (US); Qing Hua Wang, Scottsdale, AZ (US)

(72) Inventors: Alexander A. Green, Scottsdale, AZ (US); Matthew Gilliam, Tempe, AZ (US); Ahmed Yousaf, Hillsboro, OR (US); Qing Hua Wang, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 455 days.

(21) Appl. No.: 16/832,225

(22) Filed: Mar. 27, 2020

(65) Prior Publication Data
US 2020/0377727 A1  Dec. 3, 2020

Related U.S. Application Data

(60) Provisional application No. 62/826,073, filed on Mar. 29, 2019.

(51) Int. Cl.
| | |
|---|---|
| *C08F 2/46* | (2006.01) |
| *C08F 2/50* | (2006.01) |
| *C08G 61/04* | (2006.01) |
| *C08L 83/04* | (2006.01) |
| *C08K 3/38* | (2006.01) |
| *C08G 77/56* | (2006.01) |
| *B82Y 30/00* | (2011.01) |
| *B33Y 70/00* | (2020.01) |

(52) U.S. Cl.
CPC .............. *C08L 83/04* (2013.01); *C08G 77/56* (2013.01); *C08K 3/38* (2013.01); *B33Y 70/00* (2014.12); *B82Y 30/00* (2013.01); *C08K 2201/011* (2013.01)

(58) Field of Classification Search
CPC ......... B33Y 80/00; B33Y 10/00; B33Y 70/00; B33Y 30/00; C08G 77/56; C08G 77/20; C08G 77/28; C08L 83/04; C08L 83/08; C08L 83/00; C08K 7/00; C08K 3/38; C08K 2201/011; B29C 64/124
USPC .................................... 522/99, 1, 148; 520/1
See application file for complete search history.

(56) References Cited

U.S. PATENT DOCUMENTS

| | | | |
|---|---|---|---|
| 10,155,782 B2 | 12/2018 | Wang et al. | |
| 10,711,210 B2 | 7/2020 | Green et al. | |
| 10,781,108 B2 * | 9/2020 | Kondo | ..................... H01M 4/58 |
| 2017/0267867 A1 * | 9/2017 | Tasaki | ...................... C09D 7/66 |
| 2019/0144305 A1 | 5/2019 | Wang et al. | |

FOREIGN PATENT DOCUMENTS

| | | | |
|---|---|---|---|
| WO | WO 2017083693 | 5/2017 | |
| WO | WO-2017188896 A1 * | 11/2017 | ........... B29C 64/129 |
| WO | WO 2020028391 | 2/2020 | |

OTHER PUBLICATIONS

U.S. Appl. No. 17/264,766, filed Jan. 29, 2021, Green et al.
Balan et al., "Exfoliation of a non-van der Waals material from iron ore hematite," Nature Nanotechnology, Jul. 2018, 13:602-609.
Coleman et al., "Two-Dimensional Nanosheets Produced by Liquid Exfoliation of Layered Materials," Science, Feb. 4, 2011, 331:568-571.
Colombo et al., "Polymer-Derived Ceramics: 40 Years of Research and Innovation in Advanced Ceramics," Journal of the American Ceramic Society, Jul. 2010, 93(7):1805-1837.
Eckel et al., "Additive manufacturing of polymer-derived ceramics." Science, Jan. 1, 2016, 351(6268):58-62.
Eksik et al., "Epoxy Nanocomposites with Two-Dimensional Transition Metal Dichalcogenide Additives," ACS Nano, Apr. 22, 2014, 8(5):5282-5289.
Fahrenholtz et al., "Refractory Diborides of Zirconium and Hafnium," Journal of the American Ceramic Society, May 2007, 90(5):1347-1364.
Gross et al. "Evaluation of 3D Printing and Its Potential Impact on Biotechnology and the Chemical Sciences," Analytical Chemistry, Jan. 16. 2014, 86:3240-3253.
Hernandez et al., "High-yield production of graphene by liquid-phase exfoliation of graphite." Nature Nanotechnology, Sep. 2008, 3:563-568.
Hundley et al., "Geometric characterization of additively manufactured polymer derived ceramics," Additive Manufacturing, Aug. 26, 2017, 18:95-102.
Kitson et al., "Combining 3D printing and liquid handling to produce user-friendly reactionware for chemical synthesis and purification," Chemical Science, Jun. 10, 2013, 4:3099-3103.
Lee et al., "Micro 3D Printing Using a Digital Projector and its Application in the Study of Soft Materials Mechanics," Journal of Visualized Experiments, Nov. 27, 2012, 69(e4457):1-5.

(Continued)

Primary Examiner — Jessica Whiteley
(74) Attorney, Agent, or Firm — Fish & Richardson P.C.

(57) ABSTRACT

A polymerizable composition for 3D printing includes a photocurable polymer resin and metal diboride nanosheets. The resulting polymer nanocomposite includes a polymer matrix and metal diboride nanosheets dispersed throughout the polymer matrix. A method of synthesizing a nanomaterial-containing resin for 3D printing includes preparing a dispersion of metal diboride nanosheets in a solvent, and combining the dispersion with a liquid polymer resin to yield the nanomaterial-containing resin. A method of fabricating a nanocomposite structure from the nanomaterial-containing resin includes providing the nanomaterial-containing resin to a three-dimensional printer, forming a three-dimensional structure with the three-dimensional printer, and processing the three-dimensional structure to yield the nanocomposite structure.

19 Claims, 3 Drawing Sheets

(56) References Cited

OTHER PUBLICATIONS

Li et al., "Scalable Production of Few-Layer Boron Sheets by Liquid-Phase Exfoliation and Their Superior Supercapacitive Performance," ACS Nano, Jan. 29, 2018, 12:1262-1272.
Manapat et al., "3D Printing of Polymer Nanocomposites via Stereolithography," Macromolecular Materials and Engineering, 2017, 302(1600553):1-13.
Nagamatsu et al., "Superconductivity at 39 K in magnesium diboride," Nature, Mar. 1, 2001, 410:63-64.
Nemir et al., "PEGDA Hydrogels With Patterned Elasticity: Novel Tools for the Study of Cell Response to Substrate Rigidity," Biotechnology and Bioengineering, Oct. 8, 2010, 105(3):636-644.
Ramanathan et al., "Functionalized graphene sheets for polymer nanocomposites." Nature Nanotechnology, Jun. 2008, 3:327-331.
Schmidt et al., "Digital light processing of ceramic components from polysiloxanes," Journal of the European Ceramic Society, Jul. 31, 2018, 38:57-66.

* cited by examiner

3D-PRINTED NANOCOMPOSITES WITH METAL DIBORIDE NANOSHEETS

CROSS-REFERENCE TO RELATED APPLICATION

This application claims the benefit of U.S. Patent Application No. 62/826,073, entitled "3D-PRINTED NANOCOMPOSITES WITH METAL DIBORIDE NANOSHEETS" and filed on Mar. 29, 2019, which is incorporated by reference herein in its entirety.

STATEMENT OF GOVERNMENT INTEREST

This invention was made with government support under 1610153 awarded by the National Science Foundation. The government has certain rights in the invention.

TECHNICAL FIELD

This invention relates to three-dimensional (3D)-printed composite materials that contain metal diboride nanosheets.

BACKGROUND

Three-dimensional (3D) printing or additive manufacturing can be used for precise production of materials and components for industrial and research applications. Of the many types of 3D printing, a process that typically yields excellent resolution is stereolithography (SLA) 3D printing, which involves selectively curing a liquid photocurable polymer precursor with two-dimensional (2D) patterns of light to make a layered three-dimensional structure.

SUMMARY

The metal diborides are a family of compounds with the composition $MB_2$ (M is a metal) that are known for their exceptional materials properties. Harnessing solution-phase exfoliation, metal diboride nanosheets can be efficiently integrated into three-dimensional (3D)-printed nanocomposites using a range of different polymer matrices. The metal diborides $CrB_2$, $MgB_2$, and $TiB_2$ can be incorporated into printed structures with various resins. Metal diboride nanosheets can also be incorporated into preceramic polymers. Following pyrolysis, the resulting 3D-printed structures transform into ceramic nanocomposites with precisely defined geometries. These 3D-printed nanocomposites, enhanced by incorporated metal diboride nanosheets, are suitable for medical, structural, and aeronautical applications, as well as applications that benefit from increased mechanical strength, increased chemical and thermal resistance, increased thermal and electrical conductivity, and improved durability and catalytic activity.

In a first general aspect, a polymerizable composition includes a photocurable polymer resin and metal diboride nanosheets.

Implementations of the first general aspect may include one or more of the following features.

The photocurable polymer resin may include a prototyping polymer. The photocurable polymer resin may include a biocompatible polymer. In some cases, the photocurable polymer resin includes a crosslinkable silicone polymer. The polymerizable composition may include a photoinitiator, a photoinhibitor, an ultraviolet absorber, or any combination thereof. The metal diboride nanosheets may include chromium diboride nanosheets, magnesium diboride nanosheets, titanium diboride nanosheets, hafnium diboride nanosheets, zirconium diboride nanosheets, aluminum diboride nanosheets, niobium diboride nanosheets, tantalum diboride nanosheets, vanadium diboride nanosheets, molybdenum diboride nanosheets, tungsten diboride nanosheets, osmium diboride nanosheets, ruthenium diboride nanosheets, rhenium diboride nanosheets, or any combination thereof. A concentration of the metal diboride nanosheets in the photocurable polymer resin is typically in a range of 0.005 wt % to 1 wt %. In some cases, the metal diboride nanosheets are homogenously dispersed in the photocurable polymer resin.

In a second general aspect, a polymer nanocomposite includes a polymer matrix and metal diboride nanosheets dispersed throughout the polymer matrix.

Implementations of the second general aspect may include one or more of the following features.

The metal diboride nanosheets may include chromium diboride nanosheets, magnesium diboride nanosheets, titanium diboride nanosheets, hafnium diboride nanosheets, zirconium diboride nanosheets, aluminum diboride nanosheets, niobium diboride nanosheets, tantalum diboride nanosheets, vanadium diboride nanosheets, molybdenum diboride nanosheets, tungsten diboride nanosheets, osmium diboride nanosheets, ruthenium diboride nanosheets, rhenium diboride nanosheets, or any combination thereof. A concentration of the metal diboride nanosheets in the polymer matrix is typically in a range of 0.005 wt % to 1 wt %. In some cases, the polymer matrix includes a crosslinked silicone polymer.

In a third general aspect, a three-dimensional-printed structure includes the polymer nanocomposite of the second general aspect.

In a fourth general aspect, synthesizing a nanomaterial-containing resin includes preparing a dispersion of metal diboride nanosheets in a solvent, and combining the dispersion with a liquid polymer resin to yield the nanomaterial-containing resin.

Some implementations of the fourth general aspect include removing the solvent from the nanomaterial-containing resin.

In a fifth general aspect, fabricating a nanocomposite structure includes providing the nanomaterial-containing resin of the fourth general aspect to a three-dimensional printer, forming a three-dimensional structure with the three-dimensional printer, and processing the three-dimensional structure to yield the nanocomposite structure.

Implementations of the fifth general aspect may include one or more of the following features.

In some cases, processing the three-dimensional structure includes soaking the three-dimensional structure in a solvent, exposing the three-dimensional structure to ultraviolet radiation, pyrolyzing the three-dimensional structure, or any combination thereof.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

As precursors to stereolithography (SLA) 3D printing are liquid, mixing nanoscale fillers to liquid photocurable resins is an effective method to produce SLA 3D-printed nanocomposites. Such 3D-printed nanocomposites not only exhibit the enhanced properties of typical nanocomposites, but can also be fabricated in any shape to fulfill specific spatial or structural requirements. As described herein, metal diboride nanomaterials are incorporated into 3D-printed structures by solvent-resin mixing and solvent removal to yield 3D-printed metal diboride nanocomposites.

Liquid-phase exfoliation is a low-cost, high-throughput method of generating solution-processable samples of two-dimensional (2D) nanosheets. It can be applied to exfoliate many common van der Waals solids, including graphite, transition metal dichalcogenides, and boron nitride to produce their 2D counterparts. Liquid-phase exfoliation of bulk metal diboride powders in organic solvents and aqueous surfactants can produce liquid dispersions of 2D metal diboride nanosheets. The metal diborides, which possess the formula $MB_2$, have exceptional properties, including high temperature superconductivity (e.g., with magnesium diboride) and ultra-high temperature melting points (>3000° C.) and high hardness as with titanium diboride, hafnium diboride, and zirconium diboride. Solution-phase processing allows the production of polymer nanocomposites from liquid polymer precursors.

Figure 1:
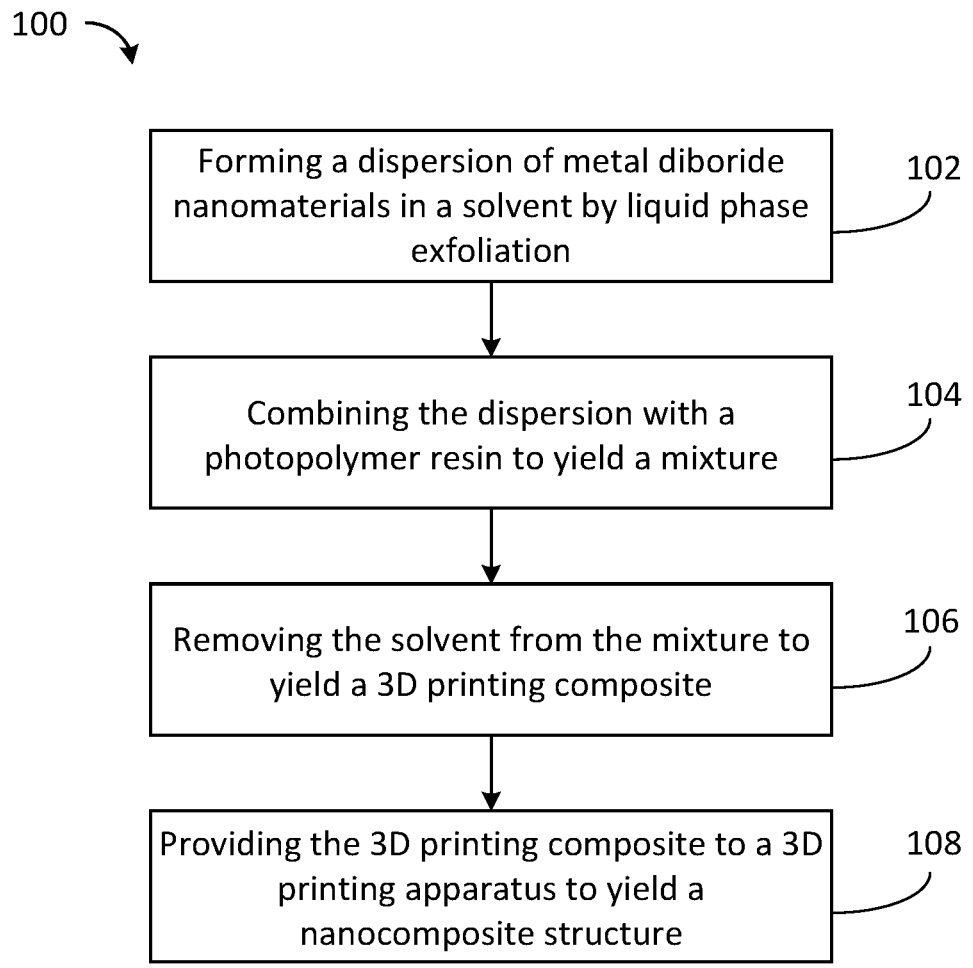
FIG. 1 is a flowchart showing operations in a process for fabricating nanocomposite structures incorporating metal diborides by stereolithography three-dimensional (3D) printing.

FIG. 1 depicts a flowchart showing operations in process 100 for fabricating nanocomposites structures incorporating metal diborides by stereolithography 3D printing. In 102, a dispersion of metal diboride nanomaterials is formed in a solvent by liquid phase exfoliation. Examples of suitable metal diboride ($MB_2$) nanomaterials include chromium diboride ($CrB_2$), magnesium diboride ($MgB_2$), titanium diboride ($TiB_2$), hafnium diboride ($HfB_2$), zirconium diboride ($ZrB_2$), aluminum diboride ($AlB_2$), niobium diboride ($NbB_2$), tantalum diboride ($TaB_2$), vanadium diboride ($VB_2$), molybdenum diboride ($MoB_2$), tungsten diboride ($WB_2$), osmium diboride ($OsB_2$), ruthenium diboride ($RuB_2$), and rhenium diboride ($ReB_2$) nanosheets. Suitable solvents typically have a low boiling point (e.g., are volatile), are miscible with printing resins, and can be used to form stable dispersions of metal diborides. Examples of suitable solvents include isopropanol (IPA), acetone, chloroform, diethyl ether, methanol, ethanol, ethyl acetate, and dichloromethane. Other solvents may also be considered, including dimethyl sulfoxide, cyclohexanone, cyclopentanone, 1-vinyl-pyrrollidinone, dimethylformamide, N-methyl-pyrrolidinone, acetonitrile, formamide, benzonitrile 1,3-dimethyl-2-imidazolidinone, benzyl benzoate, N,N'-dimethylpropyleneurea, gamma-butyrolactone, dimethylacetamide, dibenzyl ether, 1-ethyl-2-pyrollidinone, 1,2-dichlorobenzene, 1,3-dioxolane, quinoline, benzaldehyde, 1-octyl-2-pyrrollidinone, ethanolamine, diethylphthalate, dimethylphthalate, pyridine, vinyl acetate, 1-dodecyl-2-pyrollidinone, ethylene glycol, toluene, heptane, hexane, pentane, and other appropriate organic solvents selected to incorporate nanosheet dispersions into printing resins, including resins having less hydrogen-bonding or more hydrophobic character, while not diluting the resin or affecting its overall properties.

The dispersion of metal diboride nanomaterials may be formed by combining a metal diboride bulk powder with the solvent to yield a first mixture and subjecting the mixture to tip ultrasonication. Bath sonication can also be used in order to scale up production as well as to reduce the concentration of contaminants that may be introduced by degradation of tips used in tip ultrasonication. The resulting dispersion may be centrifuged to sediment out larger flakes and aggregates. In 104, the supernatant is combined with a photopolymer resin to yield a second mixture. Examples of suitable photopolymer resins include commercially available photopolymer resins (e.g., PR48, SM-442, SM-472, DMG-301, IC131, IC142, IC163, and PR-57 available from Colorado Photopolymer Solutions) and resins that can be prepared from various photocurable acrylated polymers (e.g., poly(ethylene glycol) diacrylate (PEGDA), soybean oil epoxidized acrylate (SOEA), or hydroxyethylmethacrylate (HEMA)). In some cases, the photopolymer resin includes one or more additives (e.g., silica nanoparticles to allow for the synthesis of glass structures, carbon nanomaterials to enhance electrical conductivity, additional reactive polymers to serve as crosslinkers, additional photoinitiators to enhance curing rate, additional inhibitors to control curing rate, additional UV absorbers to enhance printing resolution, or any combination thereof).

In 106, the solvent is removed from the second mixture (e.g., by rotary evaporation) to yield a 3D printing composite. A concentration of metal diboride in the 3D printing composite is typically in a range of approximately 0.005 wt % to 1 wt %. In 108, the 3D printing composite is provided to 3D printing apparatus to yield a nanocomposite structure by SLA 3D printing.

Figure 2:
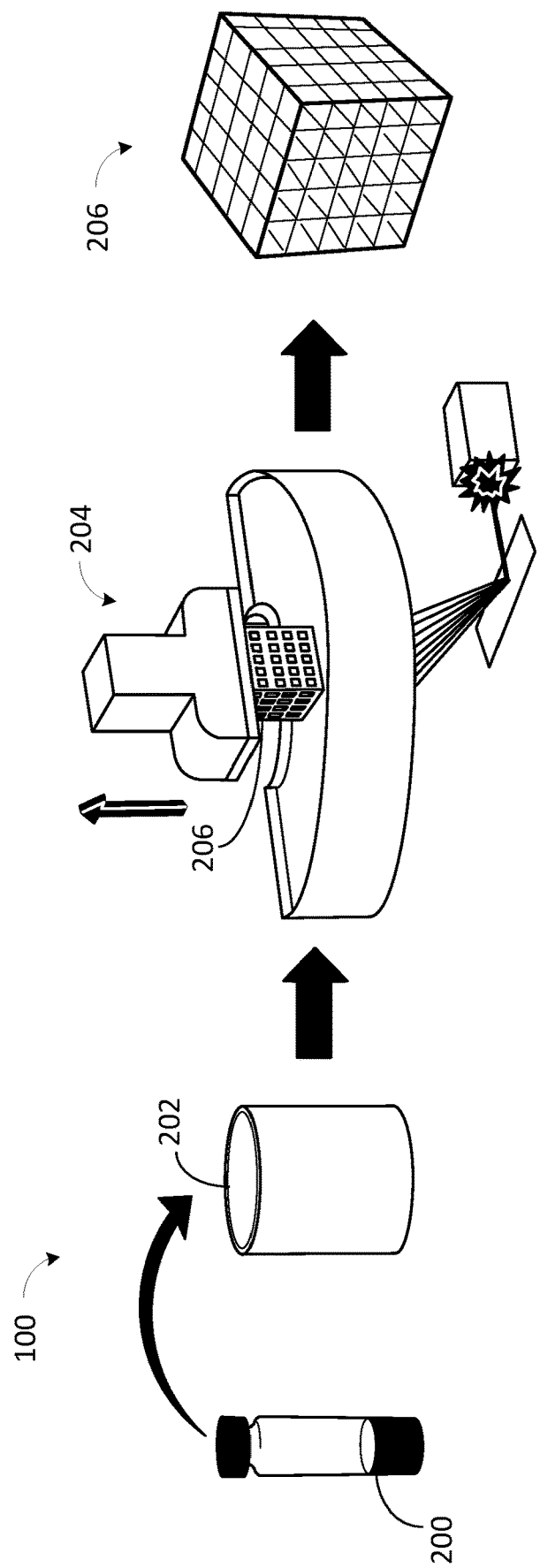
FIG. 2 depicts the process shown in FIG. 1.

FIG. 2 depicts process 100 of FIG. 1. Dispersion 200 of metal diboride nanomaterials is formed in a solvent by liquid phase exfoliation. At least a portion of the dispersion (e.g., a supernatant) is combined with photopolymer resin 202 to yield a mixture, and the solvent is removed from the mixture to yield a 3D printing composite. The 3D printing composite is provided to 3D printing apparatus 204 to yield nanocomposite structure 206.

Preceramic polymers may also be used as 3D printing feedstocks to fabricate 3D ceramic structures. Preceramic polymers or polymer-derived ceramics are silicon-based polymers that, when sufficiently crosslinked and pyrolyzed at high temperatures (e.g., 1000° C.), are consolidated into amorphous ceramic structures. These 3D-printed ceramic structures exhibit the high-temperature resistance and mechanical properties that can be expected from ceramic structures synthesized by other techniques. As described herein, metal diboride nanosheets can be incorporated into 3D-printed ceramic structures by mixing with a preceramic polymer resin, SLA 3D printing, and subsequent pyrolysis.

Figure 3:
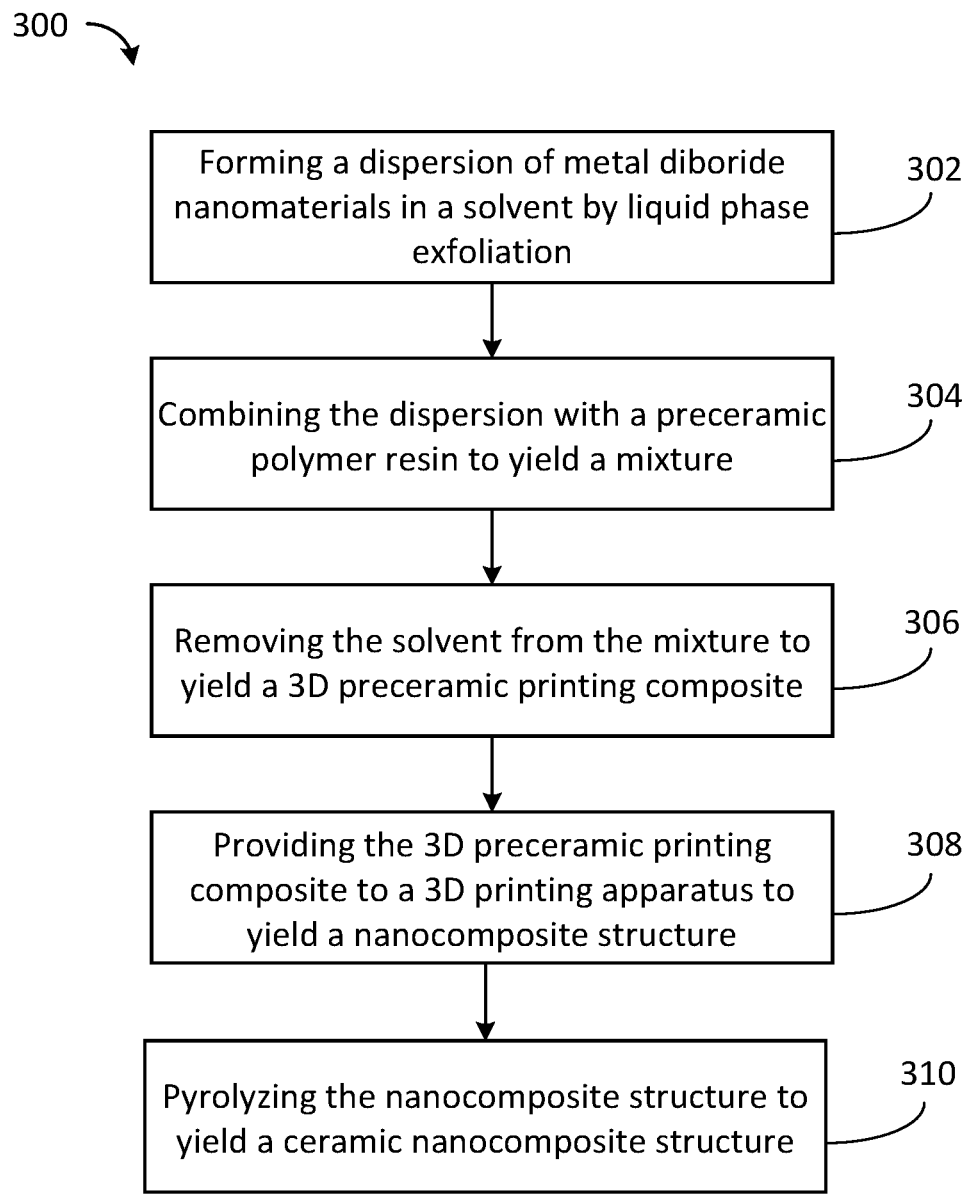
FIG. 3 is a flowchart showing operations in a process for fabricating 3D-printed ceramic/metal diboride nanocomposites.

FIG. 3 is a flowchart showing operations in process 300 for fabricating preceramic polymer nanocomposites. In 302, a dispersion of metal boride nanosheets is prepared as described with respect to FIG. 1. In 304, a supernatant from the dispersion is combined with a preceramic polymer resin to yield a mixture. The preceramic polymer resin typically includes a crosslinkable silicone polymer, which includes acrylated siloxanes that can self-crosslink or a mixture of siloxanes with reactive groups that can crosslink with each other (e.g. thiol-containing siloxanes and vinyl-containing siloxanes). In some cases, the preceramic polymer resin includes one or more additives (e.g., additional unreactive siloxanes to increase ceramic yield after pyrolysis, zirconium dioxide nanoparticles to increase the mechanical durability of 3D-printed structure before pyrolysis and reduce shrinkage during pyrolysis, carbon nanomaterials to enhance electrical conductivity, other reactive polymers to serve as additional crosslinkers, additional photoinitiators to enhance curing rate, additional inhibitors to control curing rate, additional UV absorbers to enhance printing resolution, or any combination thereof). In 306, the solvent is removed from the mixture (e.g., by rotary evaporation) to yield a 3D preceramic printing composite. In 308, the 3D printing composite is provided to a 3D printing apparatus to yield a nanocomposite structure by SLA 3D printing. In 310, after washing and post-curing, the nanocomposite structure is pyrolyzed (e.g., at 1000° C.) to yield a ceramic nanocomposite structure.

3D-printed nanocomposites containing metal diboride ceramic fillers allow for the production of more thermally stable 3D-printed architectures, suitable for use in microfluidics or chemical reaction-ware setups, where high temperatures may be required to allow certain reactions to progress. Incorporating these metal diboride nanofillers into ceramic structures provides another way to take advantage of the high-temperature stability of some of the more exceptional metal diborides (like those with melting points above 3000° C.). Such nanocomposites provide higher thermal and oxidative resistance than their ceramic-only counterparts, thus providing benefits in aerospace applications or in other scenarios that involve operation under extreme environmental conditions.

EXAMPLES

To fabricate 3D-printed PR48 and PEGDA structures, dispersions of chromium diboride ($CrB_2$), magnesium diboride ($MgB_2$), and titanium diboride ($TiB_2$) nanosheets were first prepared in isopropanol (IPA) using liquid-phase exfoliation. Bulk powders of metal diborides were mixed with IPA and subjected to tip ultrasonication followed by centrifugation to sediment out larger flakes and aggregates. The supernatant dispersions of nanosheets were then collected and mixed via magnetic stirring with resins (either PR48 or PEGDA) overnight. The mixtures were then placed in a rotary evaporator for 15-30 minutes to remove IPA. The nanomaterial-containing resin was then poured into a resin tray and printed using an Ember Precision Desktop 3D Printer from Autodesk. Computer-generated models were created using Autodesk Fusion 360 software. PR48 resin (Colorado Photopolymer Solutions) was used as received in order to generate the unmodified PR48 structures. PEGDA resin was prepared by mixing PEGDA (700 g/mol, Sigma Aldrich), phenylbis(2,4,6-trimethylbenzoyl)phosphine oxide (BAPO, Sigma Aldrich), and Sudan I dye (Sigma Aldrich), and stirring the mixture via magnetic stir bar for at least 24 hours. All printed structures were soaked in IPA overnight and post-cured in a UV chamber with a 365 nm wavelength source for 15 minutes.

A variety of 3D-printed structures were fabricated by the process described with respect to FIG. 1. $CrB_2$ was incorporated into various structures, including a sphere, a trident, and a cubic lattice. PEGDA resin was also used to 3D-print structures, with PEGDA structures containing $CrB_2$ nanosheets and $MgB_2$ nanosheets. PR48 dogbone-shaped structures with an increasing amount of $TiB_2$ nanosheets demonstrated successful and uniform incorporation of metal diboride nanosheets into the polymer network.

To fabricate the preceramic polymer nanocomposites, a dispersion of $MgB_2$ nanosheets was first synthesized using the procedure as described with respect to FIG. 2. The preceramic polymer resin was prepared by mixing (mercaptopropyl)methylsiloxane homopolymer (HMPS, Gelest) and vinylmethoxysiloxane homopolymer (HVMS, Gelest) in a 1:1 mass ratio, followed by 4-methoxyphenol (MEHQ, Sigma). The mixture was then left stirring overnight to allow the MEHQ to properly dissolve. Next, $MgB_2$/acetone dispersion, BAPO, and Sudan I were added, and the mixture was under rotary evaporation for ~10-15 minutes to remove acetone. The mixture containing the preceramic polymers and $MgB_2$ was then 3D-printed as described herein. The as-printed structures were soaked briefly in acetone followed by IPA and then left to dry before being post-cured for 15 minutes in a UV chamber. 3D-printed preceramic nanocomposites were pyrolyzed at 1000° C. for 1 hour in a quartz tube furnace to produce the final ceramic structures. Control ceramic structures without incorporation of $MgB_2$ nanosheets were synthesized similarly to the above method, except with no addition of $MgB_2$/acetone dispersion.

A variety of 3D-printed preceramic and ceramic structures were fabricated as described with respect to FIG. 2. Compared to the control structure printed without $MgB_2$ nanosheets, the structure printed with $MgB_2$ dispersion is noticeably darker in color, indicating uniform incorporation of nanomaterial with the polymer matrix. The percent edge length shrinkage and the percent mass loss of the $MgB_2$-containing structure before and after pyrolysis was 33.3% and 49.4%, respectively. The 3D-printed nanocomposites preserve the open structure of the cubic lattice design before and after pyrolysis, respectively.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A polymerizable composition comprising:
   a photocurable polymer resin comprising a crosslinkable silicone polymer; and
   metal diboride nanosheets.

2. The composition of claim 1, wherein the photocurable polymer resin comprises a prototyping polymer.

3. The composition of claim 1, wherein the photocurable polymer resin comprises a biocompatible polymer.

4. The composition of claim 1, further comprising a photoinitiator.

5. The composition of claim 1, further comprising a photoinhibitor.

6. The composition of claim 1, further comprising an ultraviolet absorber.

7. The composition of claim 1, wherein the metal diboride nanosheets comprise chromium diboride nanosheets, magnesium diboride nanosheets, titanium diboride nanosheets, hafnium diboride nanosheets, zirconium diboride nanosheets, aluminum diboride nanosheets, niobium diboride nanosheets, tantalum diboride nanosheets, vanadium diboride nanosheets, molybdenum diboride nanosheets, tungsten diboride nanosheets, osmium diboride nanosheets, ruthenium diboride nanosheets, rhenium diboride nanosheets, or any combination thereof.

8. The composition of claim 1, wherein a concentration of the metal diboride nanosheets in the photocurable polymer resin is in a range of 0.005 wt % to 1 wt %.

9. The composition of claim 1, wherein the metal diboride nanosheets are homogenously dispersed in the photocurable polymer resin.

10. A polymer nanocomposite comprising:
   a polymer matrix comprising a crosslinked silicone polymer; and
   metal diboride nanosheets dispersed throughout the polymer matrix.

11. The polymer nanocomposite of claim 10, wherein the metal diboride nanosheets comprise chromium diboride nanosheets, magnesium diboride nanosheets, titanium diboride nanosheets, hafnium diboride nanosheets, zirconium diboride nanosheets, aluminum diboride nanosheets, niobium diboride nanosheets, tantalum diboride nanosheets, vanadium diboride nanosheets, molybdenum diboride nanosheets, tungsten diboride nanosheets, osmium diboride nanosheets, ruthenium diboride nanosheets, rhenium diboride nanosheets, or any combination thereof.

12. The polymer nanocomposite of claim 10, wherein a concentration of the metal diboride nanosheets in the polymer matrix is in a range of 0.005 wt % to 1 wt %.

13. A three-dimensional-printed structure comprising the polymer nanocomposite of claim 10.

14. A method of synthesizing a nanomaterial-containing resin, the method comprising:
   preparing a dispersion of metal diboride nanosheets in a solvent; and
   combining the dispersion with a liquid polymer resin comprising a crosslinkable silicone polymer to yield the nanomaterial-containing resin.

15. The method of claim 14, further comprising removing the solvent from the nanomaterial-containing resin.

16. A method of fabricating a nanocomposite structure, the method comprising:
   providing the nanomaterial-containing resin of claim 14 to a three-dimensional printer;
   forming a three-dimensional structure with the three-dimensional printer; and
   processing the three-dimensional structure to yield the nanocomposite structure.

17. The method of claim 16, wherein processing the three-dimensional structure comprises soaking the three-dimensional structure in a solvent.

18. The method of claim 17, wherein processing the three-dimensional structure further comprises exposing the three-dimensional structure to ultraviolet radiation.

19. The method of claim 18, wherein processing the three-dimensional structure further comprises pyrolyzing the three-dimensional structure.

* * * * *